US009201982B2

(12) United States Patent
Lin et al.

(10) Patent No.: US 9,201,982 B2
(45) Date of Patent: Dec. 1, 2015

(54) PRIORITY SEARCH TREES

(75) Inventors: Bo Lin, East Kilbride (GB); Wim Rouwet, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 186 days.

(21) Appl. No.: 13/143,551

(22) PCT Filed: Feb. 23, 2009

(86) PCT No.: PCT/IB2009/050721
§ 371 (c)(1),
(2), (4) Date: Jul. 7, 2011

(87) PCT Pub. No.: WO2010/095004
PCT Pub. Date: Aug. 26, 2010

(65) Prior Publication Data
US 2012/0030235 A1    Feb. 2, 2012

(51) Int. Cl.
*G06F 17/30* (2006.01)
(52) U.S. Cl.
CPC ................................ *G06F 17/30961* (2013.01)
(58) Field of Classification Search
CPC .............................. G06F 7/02; G06F 17/30985
See application file for complete search history.

(56) References Cited

U.S. PATENT DOCUMENTS

| 6,859,455 B1* | 2/2005 | Yazdani et al. ............... 370/392 |
| 7,523,218 B1* | 4/2009 | Sahni et al. .................. 709/238 |
| 2005/0114337 A1* | 5/2005 | Lunteren .......................... 707/9 |

OTHER PUBLICATIONS

McCreight, E.M.: "Priority Search Trees" SIAM Journal on Computing, May 1985, vol. 14, No. 2, pp. 257-276.
Agarwal, P.K.: "Lecture 7: Segment, Interval, Priority-Search Trees" Duke University Department of Computer Science Computational Geometry Course CPS234, Sep. 20, 2005, Scribed by Matthews, M.F., Section 7.3.
Hinze, R.: "A Simple Implementation Technique for Priority Search Queues" Proceedings of the 2001 International Conference on Functional Programming, Sep. 3-5, 2001, Abstract, Section 5 and 6.
Lu Haibin et al: "O(log n) Dynamic Router-Tables for Prefixes and Ranges" IEEE Transactions on Computers, vol. 53, Issue 10, Oct. 2004, pp. 1217-1230.
International Search Report and Written Opinion correlating to PCT/IB2009/050721 dated Nov. 23, 2009.

* cited by examiner

*Primary Examiner* — Dinku Gebresenbet

(57) ABSTRACT

A processor implements a priority search tree on data elements. A data point having two component values is stored for each data element. A comparison is performed to determine an order for two data points. When the first component values of the two data points are equal, a comparison is made using the second component values. When the second component values of the two data points are equal, a comparison is made using the first component values.

16 Claims, 5 Drawing Sheets

PRIORITY SEARCH TREES

FIELD OF THE INVENTION

The present invention relates to a method of implementing a priority search tree and an apparatus arranged to implement a priority search tree.

BACKGROUND OF THE INVENTION

Priority search trees are widely used in various applications of multi-dimensional searching of data representing physical parameters. For example, priority search trees are often used to help implement lookups for IP routing tables in networks operating in accordance with the Internet Protocol (IP). Also, priority search trees are used (e.g. in the Linux operating system) to locate files or pages in volatile or non-volatile memory. Furthermore, priority search trees are used bin packing applications, image recognition, VLSI design and many other application It is known to use priority search trees—see, for example the paper "*Priority Search Trees*", E. M. McCreight, SIAM J. Compt. Vol. 14, No. 2, May 1985, p. 257-276, the entire disclosure of which is incorporated herein by reference. However, it is found to be a disadvantage of the known priority search trees that they require a lot or memory and processing resources.

SUMMARY OF THE INVENTION

The present invention provides a method of implementing a priority search tree and an apparatus arranged to implement a priority search tree as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the figures are illustrated for simplicity and clarity and have not necessarily been drawn to scale.

DETAILED DESCRIPTION OF EMBODIMENTS OF THE INVENTION

In the description that follows and in the figures, examples of embodiments of the invention are described. However, it will be appreciated that the invention is not limited to the examples that are described and that other implementations may not include all of the features that are described below. It will be evident, however, that various modifications and changes may be made herein without departing from the broader scope of the invention as set forth in the appended claims.

Figure 1:
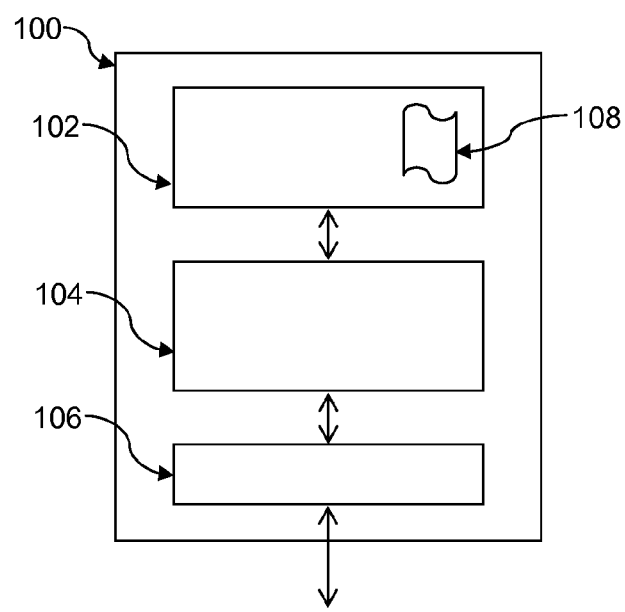
FIG. 1 shows a block diagram of an example of a data processing apparatus according to an embodiment of the invention.

FIG. 1 schematically illustrates an example of a data processing apparatus 100. The shown apparatus 100 comprises a memory 102, a processor 104 and an interface 106. As shown, the memory 102 is connected to the processor 104. The processor 104 is connected to both the interface 106 and the memory 102.

The processor 104 comprises a storage unit 110, a tree-processing module 112 and one or more comparison modules 114. The purpose and operation of the storage unit 110, the tree-processing module 112 and the one or more comparison modules 114 shall be described later.

The memory 102 may be any type of memory suitable for storing data, such as a volatile or non-volatile memory. Some or all of the memory 102 may be a read-only-memory storing data for use by the processor 104 and/or instructions (such as one or more computer programs 108) for execution by the processor 104. Some or all of the memory 102 may be a random-access-memory which the processor 104 can write data to as well as read data from (e.g. variables and/or data generated and used by the programs 108). Some or all of the programs 108 may be stored in random-access-memory. Although the memory 102 is shown internal to the apparatus 100, the memory 102 may also comprise storage external to the apparatus 100. The memory 102 may include one or more of RAM or ROM chips, FLASH memory, optical discs, magnetic discs, etc.

The processor 104 may be any type of data processor suitable for implementing a priority search tree. The processor 104 may as example be a microprocessor, such as a Central Processing Unit and for a co-processor and for a digital signal processor and for an embedded processor and for a microcontroller. The processor 104 may have a single processing core or may have multiple processing cores, which may cooperate with each other or which may be independent of each other. The processor 104 may e.g. store data in the memory 102 and may read data from the memory 102.

The processor 104 may be, for example, a hardware processor (such as an ASIC, an FPGA, a DSP, a semiconductor, etc.) that has been specifically designed for implementing an embodiment of the invention. Alternatively, the processor 104 may be a general purpose processor that is configured to execute one or more computer programs 108 stored in the memory 102, the computer programs 108 having instructions (or program code) so that when the instructions are executed by the processor, the processor implements a priority search tree. The apparatus 100 may, in fact, comprise multiple processors 104, which may cooperate with each other or which may be independent of each other.

The interface 106 may comprise one or more devices for receiving data from outside of the apparatus 100 and passing the received data to the processor 104 for processing. The interface 106 may, for example, include one or more user input devices (such as a keyboard, a mouse, etc.) for receiving input from a user in order to control the operation of the processor 104. The interface 106 may also comprise one or more devices for receiving data from the processor 104 and passing the received data outside of the apparatus 100. For example, the interface 106 may include a display (or monitor) on which information is displayed to the user. The interface 106 may also include one or more network connections (e.g. network ports or network cards) for connecting the apparatus 100 to one or more networks (such as the Internet, a local area network, a wide area network, a metropolitan area network, etc.), which may be done wirelessly and/or via cables.

The apparatus 100 may be any form of data processing apparatus, such as a mainframe, a minicomputer, a server, a workstation, a personal computer, a laptop, a notepad, a personal digital assistant, an electronic games console, an automotive and other embedded system, a cell or mobile telephone, or other type of data processing apparatus.

Figure 2:
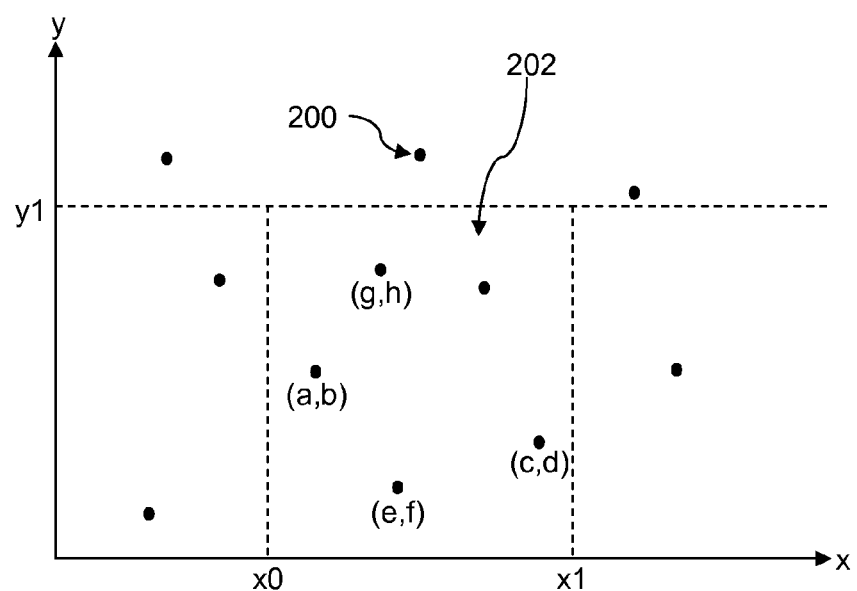
FIG. 2 shows a graph of the nature of a priority search tree and typical operations performed on a priority search tree.

As described in more detail below, the shown example apparatus 100 is arranged to implement a priority search tree (PST). The nature of a PST, and typical operations performed on a PST, are schematically illustrated in FIG. 2.

A PST is a data structure that represents one or more data elements (examples of which will be given later). In the PST, each data element is represented by (or is mapped onto) a respective data point 200, the data point 200 having a corresponding first component value and a corresponding second component value. The PST can therefore be viewed as associating the data elements with data points 200 that are points (x,y) in a two-dimensional plane. Thus, a PST represents data elements as a set of pairs in the form of (x,y).

The data element may itself already be a two-dimensional point (a,b), in which case the data point 200 in the PST corresponding to that data element could simply be the pair (a,b) or the pair (b,a). The data element may be a single numerical value, k, in which case the data point 200 corresponding to that data element could simply be the pair (k,k). The data element may be a contiguous numerical range [c,d], where [c,d] represents values z (which may be integer or non-integer values depending on the what the numerical range is to represent) for which $c \leq z \leq d$. Similarly, the data element may be a contiguous numerical range [c,d) (i.e. values z for which $c \leq z < d$), a contiguous numerical range (c,d] (i.e. values z for which $c < z \leq d$), or a contiguous numerical range (c,d) (i.e. values z for which $c < z < d$). In these cases the data point 200 corresponding to that data element could be the pair (d,c) or the pair (c,d). It will be appreciated, though, that other types of data element may be represented by pairs (x,y) in a PST.

In this specification, the terms "data point 200", "data point (x,y)" and "pair (x,y)" will be used interchangeably to mean the same thing, i.e. a component of the PST whose first component value is x and whose second component value is y.

In some embodiments, the data points 200 of the PST are constrained such that both the first and second component values are non-negative (i.e. $x \geq 0$ and $y \geq 0$ for all data points (x,y)). In some embodiments, the data points 200 are constrained such that the first and second components are integer values.

A number of operations may be implemented and provided alongside (or in association with) the PST structure, in order to form, manipulate or process the data points 200 of the PST. The operation may for example be implemented as functions or routines which can be executed by the processor 104, e.g. when running a computer program. The operations may for example include one or more of the group consisting of:

InsertPair(x,y): This operation takes as input parameters the values x and y and then inserts (or adds or includes) the pair (x,y) into the PST.

DeletePair(x,y): This operation takes as input parameters the values x and y and then deletes (or removes or cancels) the pair (x,y) from the PST. Thus, DeletePair(x,y) together with InsertPair(x,y) can be used to initialise and later modify the data points 200 making up the PST.

MinXInRectangle(x0, x1, y1): This operation takes as input parameters the values x0, x1 and y1 and returns, as its output return value, the pair (a,b) of the PST that has a minimal first component value out of all of the pairs (x,y) of the PST for which $x0 \leq x \leq x1$ and $y \leq y1$. In FIG. 2, the area for which $x0 \leq x \leq x1$ and $y \leq y1$ is indicated with reference numeral 202. Referring to the example of FIG. 2, the operation MinXInRectangle for the area 202 yields pair (a,b) from the pairs (a,b), (c,d), (e,f), (g,h) present in the area 202.

MaxXInRectangle(x0, x1, y1): This operation takes as input parameters the values x0, x1 and y1 and returns, as its output return value, the pair (c,d) of the PST that has a maximal first component value out of all of the pairs (x,y) of the PST for which $x0 \leq x \leq x1$ and $y \leq y1$. Referring to the example of FIG. 2, MaxXInRectangle yields for the area 202, the pair (c,d).

MinYInRectangle(x0, x1, y1): This operation takes as input parameters the values x0, x1 and y1 and returns, as its output return value, the pair (e,f) of the PST that has a minimal second component value out of all of the pairs (x,y) of the PST for which $x0 \leq x \leq x1$ and $y \leq y1$. Referring to FIG. 2 MinYinRectangle performed on the area 202 yields the pair (e,f) out of the pairs in the area 202.

MaxYInRectangle(x0, x1, y1): This operation takes as input parameters the values x0, x1 and y1 and returns, as its output return value, the pair (g,h) of the PST that has a maximal second component value out of all of the pairs (x,y) of the PST for which $x0 \leq x \leq x1$ and $y \leq y1$. Referring to the example of FIG. 2, MaxYInRectangle, yields when performed on the area 202, the pair (g,h).

EnumerateRectangle(x0, x1, y1): This operation takes as input parameters the values x0, x1 and y1 and returns, as a list, those pairs (x,y) of the PST for which $x0 \leq x \leq x1$ and $y \leq y1$. Referring to the example of FIG. 2, the operation EnumerateRectangle returns the five pairs in the area 202.

It will be appreciated that not all of the above-mentioned operations need to be provided or be available for use with the PST structure. Additionally, it should be noted that operations other than those mentioned above may be provided for use with the PST structure. For example, the above-mentioned operations MinXInRectangle, MaxXInRectangle, MinYInRectangle and MaxYInRectangle each have input parameters x0, x1 and y1 that identify a subset of the data points 200. However, other input parameters could be used to identify other subsets of the data points 200. For example, an operation could be provided that takes as input parameters values x0 and y0 to identify the subset of points (x,y) for which (i) $x \leq x0$ and $y \leq y0$; or (ii) $x \leq x0$ and $y < y0$; or (iii) $x < x0$ and $y > y0$; etc. Furthermore, an operation could be provided that takes as input parameters values x0, x1, y0 and y1 to identify the subset of points (x,y) for which $x0 \leq x \leq x1$ and $y0 \leq y \leq y1$. It will be appreciated that other subsets of data points 200 could be identified using similar inequality expressions, and that other operations may be provided for the PST that process and function on the data points 200 within the identified subset of data points 200.

Some of the above-mentioned functions may be required to return a single value (i.e. a unique data point 200 from the PST), as opposed to multiple values. In particular, as will be described later, in some applications of the PST it may be convenient that the function MinXInRectangle returns a single data point 200 from the PST. This may also apply to the MaxXInRectangle, MinYInRectangle and MaxYInRectangle operations.

To achieve this, prior implementations of PSTs have stipulated that no two data points 200 of the PST may have the same first component, i.e. two distinct pairs (x0,y0) and (x1, y1) of the PST must always have x0 different from x1. This then ensures that, when comparing a set of points $(x_n, y_n)$, there will be a unique point $(x_m, y_m)$ from that set that has a minimal first component value. Similarly, there will be a unique point $(x_m, y_m)$ from that set that has a maximal first component value. Two different prior art approaches achieve this as follows:

When a data element is to be represented by a pair (x,y) in the PST, rather than storing the pair (x,y) in memory for use in comparison operations and other functions, the pair (jx+y,y) is stored in the memory and processed, where j is a value such that $0 \leq x < j$ and $0 \leq y < j$. Some proposals for doing this simply store the pair $(2^W x+y, y)$ in the memory, where W is the internal word-length (e.g. 32-bits) of the processor being used for the PST.

When a data element is to be represented by a pair (x,y) in the PST, rather than storing the pair (x,y) in memory for use in comparison operations and other functions, the pair $(2^W x + (2^W - y - 1), y)$ is stored in the memory and processed, again where W is the processing word-length of the processor being used for the PST.

In embodiments of the invention, when a data element is to be represented by a pair (x,y) in the PST, then that pair (x,y) may be stored in the memory 102, i.e. the values x and y are stored. In other words, when a data element is to be represented by a pair (x,y) in the PST, then storage of the data point 200 in the memory 102 does not need to involve an expansion of the word-lengths for the component values x and y. Thus, the amount memory storage needed may be reduced and the need to use more complex and slower operators, such as multi-word comparators may be avoided.

One or more orderings may be imposed on the data points 200 of the PST, e.g. by providing one or more corresponding comparison operations for comparing two points (x0,y0) and (x1,y1). Thereby, it can be ensured that operations such as MinXInRectangle, MaxXInRectangle, MinYInRectangle and MaxYInRectangle return a unique output value.

A comparison operation may be performed by:

(i) determining the relative positions of the first data point (x0,y0) and the second data point (x1,y1) in the ordering, based on a first comparison of the respective first component values (x0 and x1) of the first and second data points and, when the first component value (x0) of the first data point equals the first component value (x1) of the second data point, based on a second comparison of the respective second component values (y0 and y1) of the first and second data points; or (ii) determining the relative positions of the first data point (x0,y0) and the second data point (x1,y1) in the ordering based on a first comparison of the respective second component values (y0 and y1) of the first and second data points and, if the second component value (y0) of the first data point equals the second component value (y1) of the second data point, based on a second comparison of the respective first component values (x0 and x1) of the first and second data points.

For example, the comparison operation involving step (i) above may comprise determining that the first data point (x0,y0) precedes (or is less than, or occurs earlier in the ordering than) the second data point (x1,y1) in the ordering. For example when either (a) the first component value (x0) of the first data point is less than the first component value (x1) of the second data point or (b) the first component value (x0) of the first data point is equal to the first component value (x1) of the second data point and the second component value (y0) of the first data point is greater than the second component value (y1) of the second data point. Phrased in a more mathematical way, with such a comparator, the point (x0,y0) is determined to precede the point (x1,y1) if x0<x1 or if both x0=x1 and y0>y1.

Also for example, the comparison operation involving step (i) above may comprise determining that the first data point (x0,y0) precedes (or is less than, or occurs earlier in the ordering than) the second data point (x1,y1) in the ordering if either (a) the first component value (x0) of the first data point is less than the first component value (x1) of the second data point or (b) the first component value (x0) of the first data point is equal to the first component value (x1) of the second data point and the second component value (y0) of the first data point is less than the second component value (y1) of the second data point. Paraphrased in a more mathematical way, with such a comparator, the point (x0,y0) is determined to precede the point (x1,y1) if x0<x1 or if both x0=x1 and y0<y1.

Furthermore, the comparison operation involving step (ii) above may comprise determining that the first data point (x0,y0) precedes (or is less than, or occurs earlier in the ordering than) the second data point (x0,y0) in the ordering if either (a) the second component value (y0) of the first data point is less than the second component value (y1) of the second data point or (b) the second component value (y0) of the first data point is equal to the second component value (y1) of the second data point and the first component value (x0) of the first data point is greater than the first component value (x1) of the second data point. Paraphrased in a more mathematical way, with such a comparator, the point (x0,y0) is determined to precede the point (x1,y1) if y0<y1 or if both y0=y1 and x0>x1.

Also, the comparison operation involving step (ii) above may comprise determining that the first data point (x0,y0) precedes (or is less than, or occurs earlier in the ordering than) the second data point (x0,y0) in the ordering if either (a) the second component value (y0) of the first data point is greater than the second component value (y1) of the second data point or (b) the second component value (y0) of the first data point is equal to the second component value (y1) of the second data point and the first component value (x0) of the first data point is less than the first component value (x1) of the second data point. Paraphrased in a more mathematical way, with such a comparator, the point (x0,y0) is determined to precede the point (x1,y1) if y0>y1 or if both y0=y1 and x0<x1.

It will be appreciated that other comparison operations and inequality expressions may be used.

As mentioned above, the ordering of two data points may involve a single comparison operation, so that a single ordering of the data points 200 of the PST is then achieved. Alternatively, the ordering may involve multiple comparison operations, so that multiple orderings of the data points 200 of the PST can then be achieved.

The MinXInRectangle and MaxXInRectangle operations can e.g. be implemented using a comparator implementing step (i) above whilst the MinYInRectangle and MaxYInRectangle operations can e.g. be implemented using a comparator implementing step (ii) above. Thus, the MinXInRectangle operation may include only a single comparison operation, with a single ordering of the data points 200 of the PST. The MaxXInRectangle and MinYInRectangle may together be performed in comparison operations, e.g. using separate orderings for the data points 200 of the PST.

For example, the MinXInRectangle operation could be implemented using the above-mentioned example comparison operation (in which the point (x0,y0) precedes the point (x1,y1) if x0<x1 or if both x0=x1 and y0>y1). In this case, the MinXInRectangle operation would return the data point 200 within the rectangle 202 that is the least data point 200 out of those data points 200 within the rectangle 202, the "least" point being determined based on the ordering of points imposed by this comparison operation. In other words, the MinXInRectangle operation would return the data point 200 within the rectangle 202 that precedes (in the ordering imposed by this comparison module) all other data points 200 within the rectangle 202. The above-mentioned second specific example comparison operation could be used analogously.

Similarly, the MaxXInRectangle operation could be implemented using the above-mentioned example comparison operation in which the point (x0,y0) precedes the point (x1, y1) if x0<x1 or if both x0=x1 and y0>y1. In this case, the MaxXInRectangle operation would return the data point 200 within the rectangle 202 that is the greatest data point 200 out of those data points 200 within the rectangle 202, the "greatest" point being determined based on the ordering of points imposed by this comparison operation. In other words, the MaxXInRectangle operation would return the data point 200 within the rectangle 202 that is preceded by (in the ordering imposed by this comparison module) all other data points 200 within the rectangle 202. The example in which (x0,y0) is deemed to precede (x1,y1) if x0<x1 or if x0=x1 and y0<y1 may be applied as well.

Similarly the MinYInRectangle operation could be implemented using the above-mentioned example comparison operation in which the point (x0,y0) precedes the point (x1, y1) if y0<y1 or if both y0=y1 and x0>x1. In this case, the MinYInRectangle operation would return the data point 200 within the rectangle 202 that is the least data point 200 out of those data points 200 within the rectangle 202, the "least" point being determined based on the ordering of points imposed by this comparison operation. In other words, the MinYInRectangle operation would return the data point 200 within the rectangle 202 that precedes (in the ordering imposed by this comparison module) all other data points 200 within the rectangle 202. The example comparison operation in which (x0,y0) is deemed to precede (x1,y1) if y0>y1, on y0=y1 and x0<x1 could be used analogously.

Similarly, the MaxYInRectangle operation could be implemented using the above-mentioned example comparison operation in which the point (x0,y0) precedes the point (x1, y1) if y0<y1 or if both y0=y1 and x0>x1. In this case, the MaxYInRectangle operation would return the data point 200 within the rectangle 202 that is the greatest data point 200 out of those data points 200 within the rectangle 202, the "greatest" point being determined based on the ordering of points imposed by this comparison operation. In other words, the MaxYInRectangle operation would return the data point 200 within the rectangle 202 that is preceded by (in the ordering imposed by this comparison module) all other data points 200 within the rectangle 202. The above-mentioned example comparison operation in which (x0,y0) is deemed to precede (x1,y1) if y0>y1, on y0=y1 and x0<x1 could be used analogously.

Using the examples of comparison operations described above can ensure that, the operations MinXInRectangle, MaxXInRectangle, MinYInRectangle and MaxYInRectangle will always return a single pair (x,y). Additionally, as the data element represented by the pair (x,y) is stored in the memory 102 as the pair of components (x,y) (i.e. without expanding the size of the memory requirements for the first component), the amount of memory required to store data points 200 when implementing a PST may be reduced compared to than prior approaches. Consequently, as there is no expansion in the data-size of the first component stored in the memory 102, then, when implementing a comparison module, the comparators used to compare the first component values of two data points 200 need not be as complex or as slow as those required in the prior approaches. Furthermore, the same type of comparators can be used for both the first and second component values.

Thus, the provision and use of the above-mentioned comparison operations allows to store an (x,y) representation of a data element as a pair (x,y) without having to use an increased amount of memory for one or both of the components x or y.

Figure 3:
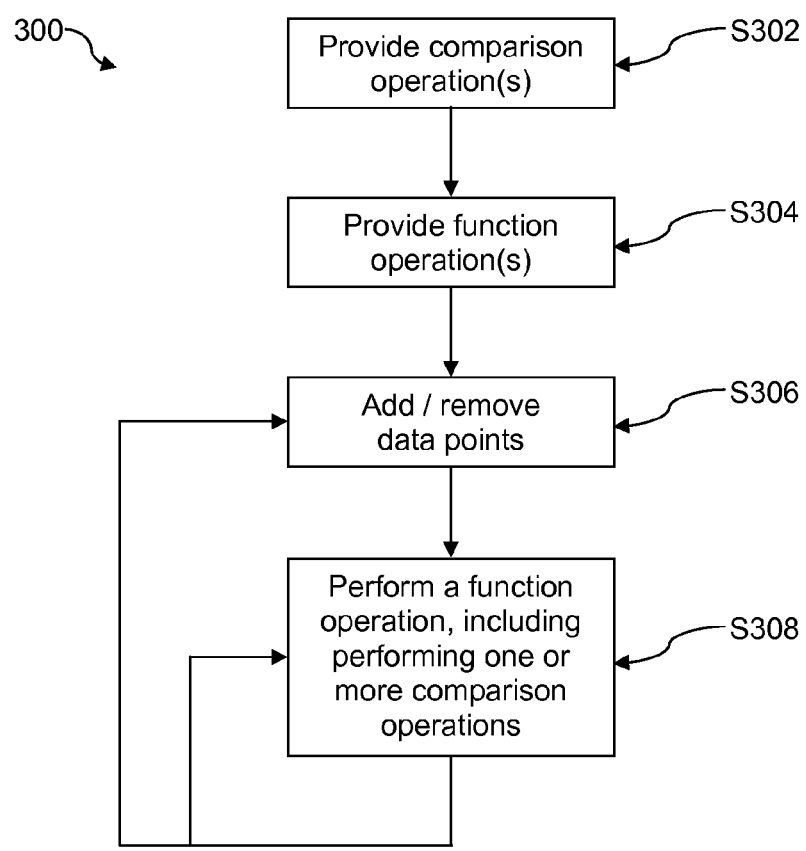
FIG. 3 shows a flowchart schematically illustrating an example of a method of implementing a priority search tree according to an embodiment of the invention.

FIG. 3 shows a flowchart schematically illustrating a method 300 of implementing a PST according to an embodiment of the invention. The method 300 may e.g. be performed by the example of FIG. 1. For example, one of the computer programs 108 may comprise instructions executable by the processor 104 which, when executed by the processor 104, cause the processor to perform (at least parts of) the method 300.

As indicated with block S302, one or more comparison operations are provided. As discussed above, a comparison module 114 is provided to perform each comparison operation. The comparison module 114 is arranged to perform its respective comparison operation by comparing a first data point of the PST and a second data point of the PST by performing one of (i) determining the relative positions of the first data point and the second data point based on a comparison of the respective first component values of the first and second data points and, if the first component value of the first data point equals the first component value of the second data point, based on a comparison of the respective second component values of the first and second data points; or (ii) determining the relative positions of the first data point and the second data point based on a comparison of the respective second component values of the first and second data points and, if the second component value of the first data point equals the second component value of the second data point, based on a comparison of the respective first component values of the first and second data points.

One or more of these comparison operations may be provided by hardware logic comparison modules 114 of the processor 104, e.g. a predetermined arrangement of hardware logic gates configured to perform the comparison operation. One or more of these comparison operations may be provided by software code instructions which may form part of, for example, a computer program 108 stored in the memory 102, and which cause the processor 104 to execute a comparison module 114. For example, the following C-macros could be used to implement the above-mentioned first and third specific example comparison operations respectively which compare a first point (a,b) with a second point (u,v) and return a value of TRUE if the point (a,b) precedes the point (u,v) in the respective orderings, and the value FALSE otherwise:

define XBT(a, b, u, v) (((a)<(u))||(((a)==(u)) && ((b)>(v))))

define YBT(a, b, u, v) (((b)<(v))||(((b)==(v)) && ((a)>(u))))

Provision of a comparison operation then imposes, or provides, a corresponding ordering on the data points 200 of the PST.

As indicated with block S304, one or more function operations are provided. A function operation is an operation (or routine or process) performed on the data points 200 of the PST. The function operation may be a function itself (insofar as it returns a value). Alternatively, the function operation may be a procedure (insofar as it operates on the points of the PST but does not return a value). The tree-processing module 112 performs the at least one function operation on the data points 200 of the PST. Performance (or execution) of the function operation involves carrying out (i.e. performing) one or more of the comparison operations provided at the step S302 one or more times using the respective comparison module(s) 114.

One or more of these function operations may be provided by hardware logic forming a tree-processing module 112 of the processor 104, e.g. by predetermined hard-coded logic component arrangements. One or more of these function operations may be provided by software code instructions which may form part of, for example, a computer program 108 stored in the memory 102, and which cause the processor 104 to execute a tree-processing module 112.

The provision of the function operations at the step S304 may involve the provision of the comparison operations at the step S302. For example, a function operation implemented using software code may include as part of that software code the instructions to implement a comparison operation. However, it will be appreciated that the comparison operation may be provided separate from the function operation. For example, a function operation implemented using software code may include instructions to call a comparison operation that has been implemented using software code instructions (e.g. a macro) separate from those forming the function operation.

In other words, the steps S302 and S304 may be interlinked and form a single step (insofar as a particular implementation of a function operation inherently includes an implementation of a comparison operation), or the steps S302 and S304 may be separate steps (insofar as a particular implementation of a function operation simply references or calls upon a separately provided implementation of a comparison operation), or both.

As indicated with block S306, the PST is formed and/or modified by adding and/or deleting data points 200 from the PST. In particular, a plurality of data elements are represented by the PST. The storage unit 110 of the processor 104 comprises logic and/or instructions for storing in the memory 102, for each data element, a corresponding data point 200. The storage unit 110 may, for example, be arranged to receive instructions and/or commands via the interface 106, containing, for example (a) data representing data elements to be added to the PST and/or (b) data representing how to modify an existing data point 200 of the PST and/or (c) data identifying a data point 200 of the PST to be cancelled from the PST. When a data element is to be represented by a data point (x,y), embodiments of the invention do not expand the sizes of the component values x or y to store that data point 200 (in contrast to the prior approaches), i.e. that data element is stored in the memory 102 as the pair (x,y). In other words, the storage unit 110 may be arranged to store the data point 200 corresponding to a data element such that the data size of the stored data point 200 equals the data size used to represent the data element. Thus, data elements input to the apparatus 100 (e.g. via the interface 106 from a user) are transformed into a PST by the processor 104 in a memory efficient manner on which the comparison modules 114 may then operate efficiently.

As indicated with block S308, the tree-processing unit 112 executes or performs a function operation. As discussed above, this involves performing one or more of the comparison operations, using respective one or more comparison modules 114, on some or all of the data points 200 of the PST. This may also involve outputting the result of the function operation, for example by displaying (e.g. via the interface 106) to a user the results of the function operation.

Processing then returns either to the step S308, at which the same, or another, function operation is executed, or to the step S306, at which the data points 200 making up the PST are modified (by adding or removing data points 200, so that the PST may be a dynamic PST).

EXAMPLE APPLICATIONS

Listed below are two example applications for a PST implemented according to embodiments of the invention. It will be appreciated, though, that other uses for such PSTs are possible and that this specification is not to be limited by the applications presented below.

Example 1

A PST can be used to provide a method of identifying, from a plurality of contiguous ranges of values (or intervals), a narrowest range of values (or interval) that contains a specified (given) range (or interval). The ranges of values may be integer or non-integer values. For this example, it is assumed that the ranges making up the plurality of ranges are one or more non-overlapping sets of nested ranges—i.e. if two ranges intersect (or overlap), then one of those ranges is a subset of the other range.

For example, consider the set of ranges $\{[a_i,b_i]: i=1 \ldots n\}$. This set may be a predetermined set of ranges or it may be a dynamic set of ranges, insofar as the ranges making up the set may vary over time (in terms of the number of ranges making up the set and/or the boundary values for the ranges). As mentioned above it is assumed that if $[a_i,b_i]$ and $[a_j,b_j]$ intersect (i.e. if $[a_i,b_i] \cap [a_j,b_j] \neq \phi$), then either $[a_i,b_i] \subseteq [a_j,b_j]$ or $[a_j,b_j] \subseteq [a_i,b_i]$ (i.e. either $a_j \leq a_i \leq b_i \leq b_j$ or $a_i \leq a_j \leq b_j \leq b_i$). It may then be desirable to able to determine which of these ranges is the narrowest range that contains a specific range $[u,v]$, i.e. for which the interval $[u,v]$ is a subset of the interval $[a_i,b_i]$ (i.e. $a_i \leq u \leq v \leq b_i$). In other words, it may be desirable to determine which range, out of the ranges in the set that contain the range $[u,v]$, has the smallest value for $b_i - a_i$.

The method 300 of FIG. 3 can then be used to achieve this task. In particular:

The step S302 would provide a comparison operation based on the above-mentioned first specific example of a comparison operation, in which a point (x0,y0) precedes (or is less than) a point (x1,y1) in the ordering defined by the comparison if x0<x1 or if both x0=x1 and y0>y1.

The step S304 would provide the MinXInRectangle operation as described above.

As indicated with block S306, data points 200 are added to the PST to define which data points 200 make up the PST. In particular, each of the ranges $[a_i,b_i]$ is a data element to be represented by the PST. For each of the ranges $[a_i,b_i]$, the step S306 of storing a data point 200 corresponding to that data element $[a_i,b_i]$ comprises storing a data point $(b_i,a_i)$, i.e. a data point whose first component value equals the maximum value for the range (i.e. $b_i$) and whose second component value equals the minimum value for the range (i.e. $a_i$).

As indicated with block S308, the MinXInRectangle(v,∞, u) operation is executed, where ∞ represents that largest possible value for the second component of a data point 200 of the PST. This set of input parameters for the MinXInRectangle function identifies a subset of the plurality of data points 200 of the PST, the subset comprising those data points for which the first component is at least the specified value v and the second component is at most the specified value u. The MinXInRectangle operation then identifies and returns the smallest, in the ordering, data point 200 from this subset of data points. The returned data point 200 then corresponds to, and hence identifies, the narrowest range of values.

Figure 4:
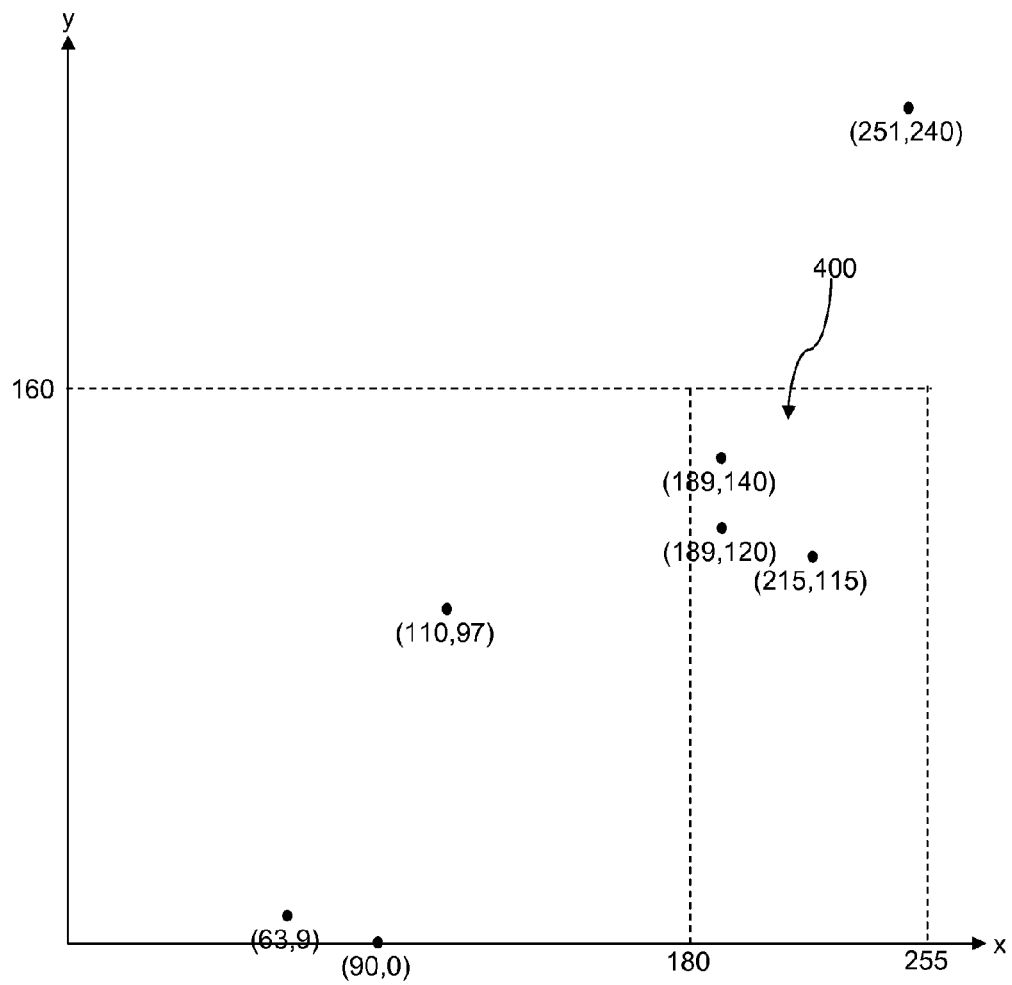
FIG. 4 schematically illustrates a priority search tree formed using an example set of ranges.

As a specific example, consider the set of ranges {[0, 90], [9, 63], [97,110], [120, 189], [140, 189], [115, 215], [240, 251]} and the specific interval [u,v]=[160,180]. FIG. 4 schematically illustrates the PST formed using the set of ranges. The rectangle 400 is the rectangle defined by the parameters (180,255,160) for the MinXInRectangle operation (where the maximum value for a boundary value is 255). The rectangle 400 identifies a subset of the points 200 of the PST that correspond to a range that contains the specific range [160, 180]. Then MinXInRectangle identifies the point (189,140), which corresponds to the range [140,189] that is the narrowest range that contains the specific range [160,180].

If the value of u and v are set to be the same value, k, then the above method can be used to find the narrowest range that includes the specified value k.

Example 2

A PST can be used to provide a method of identifying, from a plurality of binary bit strings (which may be of different lengths), the string that is the longest prefix of a specified binary string. In other words, if the plurality of binary strings is $\{s_i:i=1 \ldots n\}$ and the specified binary string is string t, then the PST can be used to determine the longest string $s_i$ which forms the start of the string t (the string t may or may not then continue after the string $s_i$). The length of the specified binary string may be a predetermined length, e.g. 32 or 64 bits long. This length shall be represented as m-bits. This set of binary bit strings $\{s_i\}$ may be a predetermined set of strings or it may be a dynamic set of strings, insofar as the strings making up the set may vary over time (in terms of the number of strings making up the set and/or the values for the strings).

The method 300 of FIG. 3 can then be used to achieve this task. In particular:

The step S302 would provide a comparison operation based on the above-mentioned first specific example of a comparison operation, in which a point (x0,y0) precedes (or is less than) a point (x1,y1) in the ordering defined by the comparison if x0<x1 or if both x0=x1 and y0>y1.

The step S304 would provide the MinXInRectangle operation as described above.

As indicated with block S306, data points 200 are added to the PST to define which data points 200 make up the PST. For each of the strings $s_i$, the step S306 of storing a data point 200 corresponding to that data element $s_i$ comprises storing a data point $(b_i,a_i)$, where $a_i$ is the m-bit number whose binary representation begins (as its most significant bits) with the string $s_i$ and ends (as its least significant bits) with 0's and where $b_i$ is the m-bit number whose binary representation begins (as its most significant bits) with the string $s_i$ and ends (as its least significant bits) with 1's. Thus, the range $[a_i,b_i]$ represents those numbers whose binary representation has the string $s_i$ as a prefix.

As indicated with block S308, the MinXInRectangle(t', $2^m-1$,t') operation is executed. Here, the binary string t' is the number whose m-bit binary representation is the binary string t. This set of input parameters for the MinXInRectangle function identifies a subset of the plurality of data points 200 of the PST, the subset comprising those data points for which the first component is at least t and the second component is at most t. The MinXInRectangle operation then identifies and returns the smallest, in the ordering, data point 200 from this subset of data points. The returned data point 200 then corresponds to, and hence identifies, the longest string $s_i$ which is a prefix for the binary string t.

Figure 5:
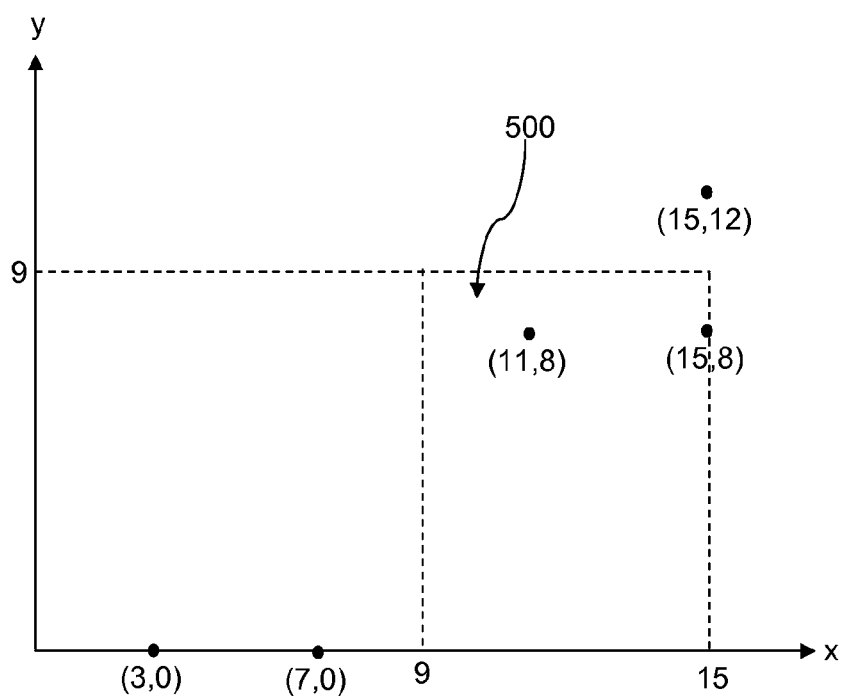
FIG. 5 schematically illustrates a priority search tree formed using an example set of binary strings.

As a specific example, consider the set of binary strings {"0", "1","11", "00", "10"} and the specific string t="1001". FIG. 5 schematically illustrates the PST formed using the set of strings. In particular:

The string $s_1$="0" corresponds to the binary range [0000, 0111] which is represented as the point (7,0) in the PST.

The string $s_2$="1" corresponds to the binary range [1000, 1111] which is represented as the point (15,8) in the PST.

The string $s_3$="11" corresponds to the binary range [1100, 1111] which is represented as the point (15,12) in the PST.

The string $s_4$="00" corresponds to the binary range [0000, 0011] which is represented as the point (3,0) in the PST.

The string $s_5$="10" corresponds to the binary range [1000, 1011] which is represented as the point (11,8) in the PST.

The rectangle 500 is the rectangle defined by the parameters (9,15,9) for the MinXInRectangle operation, as the specified string is "1001" (which is the binary representation of 9), and as the maximum value for a string value is 15 as the maximum string length in this example is m=4 bits. The rectangle 500 identifies a subset of the points 200 of the PST, these being the points 200 corresponding to a string $s_i$ that is the prefix for the string t. Then MinXInRectangle identifies the point (11,8), which corresponds to the string $s_5$="10" that is the longest prefix for the specified string "1001".

This example application of a PST implementation according to embodiments of the invention can be used for an IP routing table lookup. The specified string t could be a particular IP address. Its length may therefore be m=32 bits for IPv4 or m=128 bits for IPv6. The set of strings $\{s_i\}$ may then be various IP address prefixes input to the apparatus 100 and stored in an IP routing table in the form of a PST. The abovementioned longest-prefix-matching method may therefore be used to find the entry in the IP routing table that best matches a particular IP address.

As mentioned above, embodiments of the invention may be implemented as part of a computer program for running on a computer system. The computer program at least includes code portions for performing steps of a method according to an embodiment of the invention when run on a programmable apparatus, such as a computer system, or enabling a programmable apparatus to perform functions of a device or system according to an embodiment of the invention. The computer program may, for example, include one or more of: a subroutine, a function, a procedure, an object method, an object implementation, an executable application, an applet, a servlet, source code, object code, a shared library/dynamic load library and/or other sequence of instructions designed for execution on a computer system. The computer program may be provided on a data carrier, such as a DVD-ROM, a CD-ROM or diskette, stored with data loadable in a memory of a computer system, the data representing the computer program. The data carrier may further be a data connection, such as a telephone cable or a wireless connection.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with embodiments of the invention. Those skilled in the art will recognize that the boundaries between logic blocks are merely illustrative and that alternative embodiments may merge logic blocks or circuit elements or impose an alternate decomposition of functionality upon various logic blocks or circuit elements.

The invention claimed is:

1. An apparatus arranged to implement prefix matching on a set of Internet Protocol (IP) addresses, the apparatus comprising:
    a memory; and
    a processor comprising:
        a storage unit for storing in the memory for each of said IP addresses a corresponding data point for a priority search tree, said data point having a first component value and a second component value;
        a tree-processing module for performing at least one function operation on the data points, the at least one function operation including using a comparison module to perform a comparison operation to determine a longest prefix of an IP address in the set based on a first data point preceding a second data point in an ordering for the data points, the comparison operation comprising one of:
    determining the relative positions of a first data point and a second data point based on a comparison of the respective first component values of the first and second data points and, in response to the first component value of the first data point being equal to the first component value of the second data point, determining that the second component value of the first data point is greater than the second component of the second data point; or
    determining the relative positions of a first data point and a second data point based on a comparison of the respective second component values of the first and second data points and, in response to the second component value of the first data point being equal to the second component value of the second data point, determining that the first component value of the first data point is greater than the first component value of the second data point;
        wherein each IP address is represented by a respective binary string of a length of at most m bits and the storage unit is arranged to store in the memory the corresponding data point having the first component value equal to the m-bit number whose binary representation has most significant bits equal to the respective binary string and remaining bits equal to 1 bits and having the second component value equal to the m-bit number whose binary representation has most significant bits equal to the respective binary string and remaining bits equal to 0 bits.

2. The apparatus of claim 1, in which the storage unit is further arranged to store the data point corresponding to IP address such that the data size of the stored data point equals the data size used to represent the IP address.

3. The apparatus of claim 1, in which the comparison module is arranged to perform determining the relative positions of a first data point and a second data point by determining that the first data point precedes the second data point in the ordering if either
    (a) the first component value of the first data point is less than the first component value of the second data point or
    (b) the first component value of the first data point is equal to the first component value of the second data point and the second component value of the first data point is greater than the second component value of the second data point.

4. The apparatus of claim 1, in which the comparison module is arranged to perform determining the relative positions of a first data point and a second data point by determining that the first data point precedes the second data point in the ordering if either
    (a) the second component value of the first data point is less than the second component value of the second data point or
    (b) the second component value of the first data point is equal to the second component value of the second data point and the first component value of the first data point is greater than the first component value of the second data point.

5. The apparatus of claim 1, wherein for each IP address, that IP address represents a respective contiguous range of values defined by a lower value and an upper value and the storage unit is arranged to store in the memory the corresponding data point having the first component value equal to the upper value and the second component value equal to the lower value.

6. The apparatus of claim 1, wherein for each IP address, the storage unit is arranged to map that IP address to a respective contiguous range of values defined by a lower value and an upper value and to store in the memory the corresponding data point having the first component value equal to the lower value and the second component value equal to the upper value.

7. The apparatus of claim 1, in which one of the at least one function operations comprises:
    determining a subset of the plurality of data points based on input parameters for the function operation; and
    using the comparison operation to identify the data point in the subset that precedes all other data points in the subset based on the ordering.

8. The apparatus of claim 1, in which one of the at least one function operations comprises:
    identifying a subset of the plurality of data points based on input parameters for the function operation; and
    using the comparison operation to identify the data point in the subset that is not preceded by any data points in the subset based on the ordering.

9. A method of implementing a priority search tree to represent a plurality of internet protocol (IP) addresses, the method comprising:
    for each IP address, storing by a processor in a memory a corresponding data point for the priority search tree, wherein the data point has a first and second component value based on that IP address;
    providing by said processor a comparison operation to determine a first data point preceding a second data point in an ordering for the data points; and
    providing by said processor at least one function operation for performance on the data points, the at least one function operation involving performing the comparison operation; the comparison operation comprising one of:
    determining by said processor the relative positions of a first data point and a second data point based on a comparison of the respective first component values of the first and second data points and, in response to the first component value of the first data point being equal to the first component value of the second data point, determining that the second component value of the first data point is greater than the second component value of the second data point; and determining by said processor the relative positions of a first data point and a second data point based on a comparison of the respective second component values of the first and second data points and, in response to the second component value of the first data point being equal to the second component value of the second data point, determining that the first component value of the first data point is greater than the first component value of the second data point wherein each IP address is represented by a respective binary string of length at most a predetermined length m bits and the step of storing comprises storing the corresponding data point having the first component value equal to the m-bit number whose binary representation has most significant bits equal to the respective binary string and has remaining bits equal to 1 bits and having the second component value equal to the m-bit number whose binary representation has most significant bits equal to the respective binary string and has remaining bits equal to 0 bits.

10. The method of claim 9, in which the step of storing further comprises storing the data point corresponding to a IP address such that the data size of the stored data point equals the data size used to represent the IP address.

11. The method of claim 9, in which determining by said processor the relative positions of a first data point and a second data point comprises determining that the first data point precedes the second data point in the ordering if either
(a) the first component value of the first data point is less than the first component value of the second data point or
(b) the first component value of the first data point is equal to the first component value of the second data point and the second component value of the first data point is greater than the second component value of the second data point.

12. The method of claim 9, in which determining by said processor the relative positions of a first data point and a second data point comprises determining that the first data point precedes the second data point in the ordering if either
(a) the second component value of the first data point is less than the second component value of the second data point or
(b) the second component value of the first data point is equal to the second component value of the second data point and the first component value of the first data point is greater than the first component value of the second data point.

13. The method of claim 9, wherein for each IP address, that IP address represents a respective contiguous range of values defined by a lower value and an upper value and the step of storing comprises storing the corresponding data point having the first component value equal to the upper value and the second component value equal to the lower value.

14. The method of claim 9, wherein for each IP address, the method comprises mapping that IP address to a respective contiguous range of values defined by a lower value and an upper value and the step of storing further comprises storing the corresponding data point having the first component value equal to the lower value and the second component value equal to the upper value.

15. The method of claim 9, in which one of the at least one function operations comprises:
determining a subset of the plurality of data points based on input parameters for the function operation; and
using the comparison operation to identify the data point in the subset that precedes all other data points in the subset based on the ordering.

16. The method of claim 9, in which one of the at least one function operations comprises:
identifying a subset of the plurality of data points based on input parameters for the function operation; and
using the comparison operation to identify the data point in the subset that is not preceded by any data points in the subset based on the ordering.

* * * * *